US008170247B2

(12) United States Patent
Nishizaki et al.

(10) Patent No.: US 8,170,247 B2
(45) Date of Patent: May 1, 2012

(54) HEARING AID

(75) Inventors: Makoto Nishizaki, Tokyo (JP); Yoshihisa Nakatoh, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/992,973

(22) PCT Filed: Jun. 11, 2010

(86) PCT No.: PCT/JP2010/003895

§ 371 (c)(1), (2), (4) Date: Nov. 16, 2010

(87) PCT Pub. No.: WO2010/150475

PCT Pub. Date: Dec. 29, 2010

(65) Prior Publication Data

US 2011/0091056 A1 Apr. 21, 2011

(30) Foreign Application Priority Data

Jun. 24, 2009 (JP) ................................ 2009-149460

(51) Int. Cl.
*H04R 25/00* (2006.01)
*H04R 29/00* (2006.01)
*H04B 1/00* (2006.01)

(52) U.S. Cl. .......................... 381/312; 381/56; 381/119

(58) Field of Classification Search .......... 381/312–331, 381/56, 119
See application file for complete search history.

(56) References Cited

U.S. PATENT DOCUMENTS 5,844,816 A 12/1998 Inanaga et al.
6,741,714 B2 * 5/2004 Jensen .......................... 381/313
6,782,106 B1 8/2004 Kong et al.

FOREIGN PATENT DOCUMENTS

| | | | |
|---|---|---|---|
| JP | 1-179599 | | 7/1989 |
| JP | 6-30499 | | 2/1994 |
| JP | 2000-59893 | | 2/2000 |
| JP | 2000059893 | A * | 2/2000 |
| JP | 2000-83298 | | 3/2000 |
| WO | 95/13690 | | 5/1995 |

OTHER PUBLICATIONS

International Search Report issued Aug. 31, 2010 in International (PCT) Application No. PCT/JP2010/003895.
Supplementary European Search Report issued Aug. 25, 2011 in Application No. EP 10 77 3528.
Written Opinion of the International Searching Authority issued Aug. 31, 2010 in International (PCT) Application No. PCT/JP2010/003895.

* cited by examiner

*Primary Examiner* — Davetta W Goins
*Assistant Examiner* — Matthew Eason
(74) *Attorney, Agent, or Firm* — Wenderoth, Lind & Ponack, L.L.P.

(57) ABSTRACT

This hearing aid comprises a microphone (101) and an external input terminal (102), a hearing aid processor (150) to which audio signals from the microphone (101) and the external input terminal (102) are inputted, and a receiver (113) to which audio signals that have undergone hearing aid processing by this hearing aid processor (150) are outputted. The hearing aid processor (150) has a mixer (112) that mixes audio signals from the microphone (101) with audio signals from the external input terminal (102) and outputs these audio signals to the receiver (113), a mix ratio determination unit (111) for determining the mix ratio between audio signals from the microphone (101) and audio signals from the external input terminal (102) in this mixer (112), and a facial movement detector (110) that is connected to this mix ratio determination unit (111).

14 Claims, 13 Drawing Sheets

| State \ Variable | Environment sound (environment sound presence signal 125) | Facial movement (movement detection signal 122) |
|---|---|---|
| State S1 | yes | yes |
| State S2 | no | yes |
| State S3 | yes | no |
| State S4 | no | no |

FIG. 5

HEARING AID

TECHNICAL FIELD

The present invention relates to a hearing aid with which audio signals inputted from a television or other such external device to an external input terminal (external input signals) are outputted to a receiver in addition to audio signals acquired by a microphone (microphone input signals).

BACKGROUND ART

Recent years have witnessed proposals for a hearing aid that receives the audio of a television, CD, or other such external device directly from an external input terminal via wireless means (such as by Bluetooth), rather than picking up the sound with a microphone.

With this hearing aid, the audio of a television, CD, or other such external device can be enjoyed as a clear sound that is free from noise. This makes the hearing aid more pleasant to use for the user.

However, when the user and his family are sitting around a table while watching television, for example, the user may be unable to catch his family's conversation that is received by the microphone.

In view of this, a constitution has been disclosed with which an audio signal inputted wirelessly or with a wire from an external device to an external input terminal (external input signal) is mixed with an audio signal acquired by a microphone provided to the hearing aid (microphone input signals), and this mixture is provided to the user from a receiver.

With this hearing aid, if the sound pressure level of the audio signal acquired by the microphone (microphone input signal) is over a specific level, an attempt is made to solve the above-mentioned problem by weakening the audio signals from the external device (external input signal).

CITATION LIST

Patent Literature

Patent Literature 1: Japanese Laid-Open Patent Application H1-179599

SUMMARY

With the above-mentioned conventional constitution, the microphone input signal has to exceed a specific sound pressure level in order for the audio signal acquired by the microphone (microphone input signal) to be made more dominant than the audio signal from the external device (external input signal). Accordingly, if a soft voice (sound) is inputted to the microphone, what is known as "missed speech" ends up occurring with the conventional constitution. If the threshold of the sound pressure level is lowered to prevent this "missed speech," however, if the conversation is held in loud voices by the surrounding people, the microphone signal automatically ends up being dominant even though the user wants to hear the sound outputted from the television or other external device. Therefore, the problem is that the sound of the television becomes harder to hear. Thus, with a conventional constitution, the user cannot properly hear the sound that he wants to hear, so it is very difficult to obtain a satisfactory hearing aid effect.

It is an object of the present invention to enhance the hearing aid effect.

To achieve this object, the hearing aid of the present invention comprises a microphone, an external input terminal, a hearing aid processor, a receiver, a mixer, a facial movement detector, and a mix ratio determination unit. The microphone acquires ambient sound. The external input terminal acquires input sound inputted from an external device. The hearing aid processor receives an audio signal outputted from the microphone and the external input terminal, and subjects this audio signal to hearing aid processing. The receiver receives and outputs the audio signal that has undergone hearing aid processing by the hearing aid processor. The mixer mixes the audio signal inputted to the microphone and the audio signal inputted to the external input terminal, and outputs an audio signal to the receiver. The facial movement detector detects movement of the user's face. The mix ratio determination unit determines the mix ratio of the audio signal inputted to the microphone and the audio signal inputted to the external input terminal, and transmits this to the mixer, according to the detection result at the facial movement detector.

ADVANTAGEOUS EFFECTS

Because the hearing aid of the present invention is constituted as above, the situation is evaluated by detecting movement of the user's face, and the audio signal inputted to the microphone can be mixed in a suitable ratio with the audio signal inputted to the external input terminal, and this mixture outputted, so the hearing aid effect can be enhanced over that in the past.

BRIEF DESCRIPTION OF DRAWINGS

FIG. 5 is a table listing the states in which detection is performed by a state detector included in the hearing aid pertaining to Embodiment 1 of the present invention;

DESCRIPTION OF EMBODIMENTS

Embodiments of the present invention will now be described through reference to the drawings.

Embodiment 1

The hearing aid pertaining to Embodiment 1 of the present invention will be described through reference to FIGS. 1 to 9.

Figure 1:
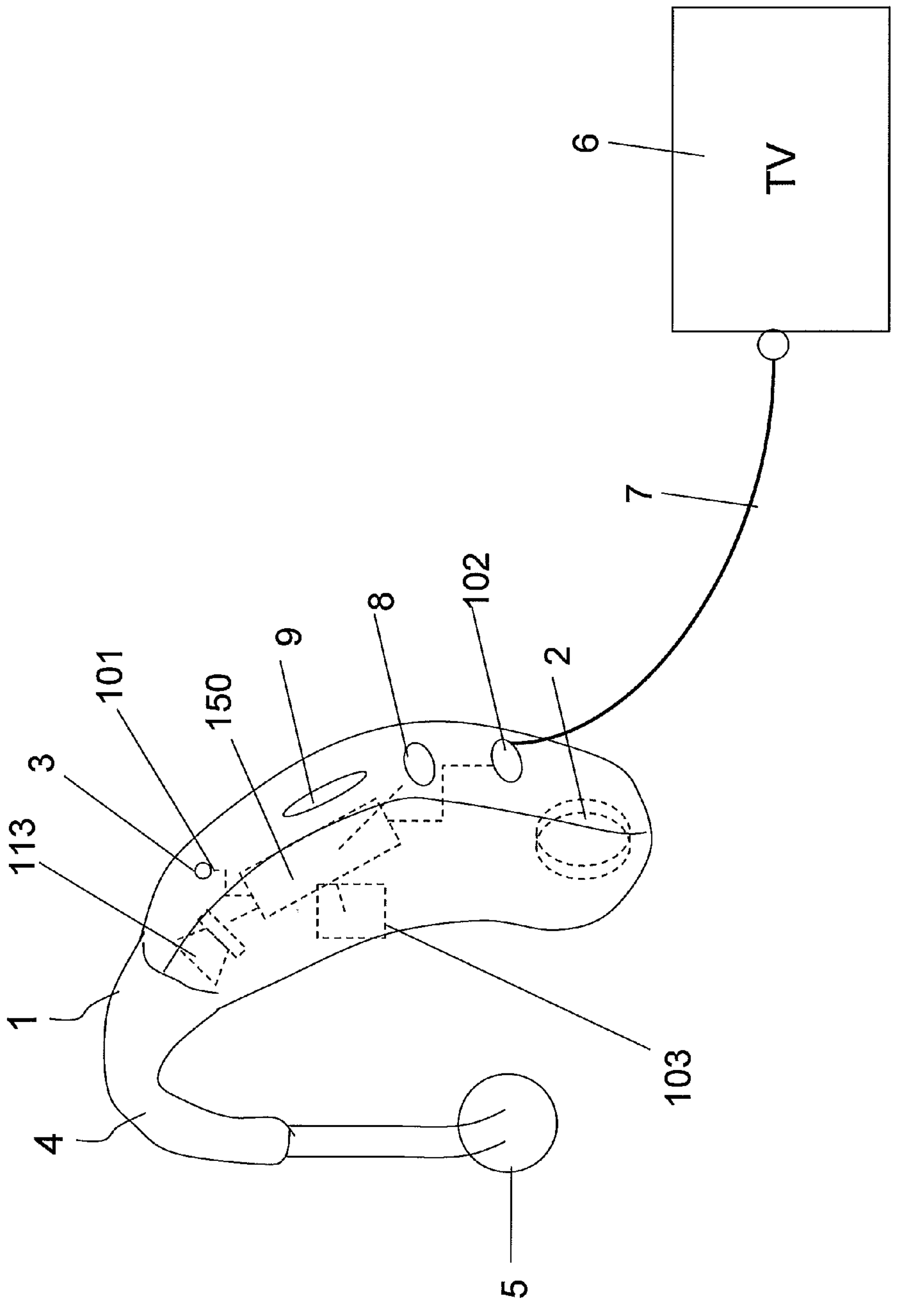
FIG. 1 is an oblique view of the hearing aid pertaining to Embodiment 1 of the present invention.
Figure 2:
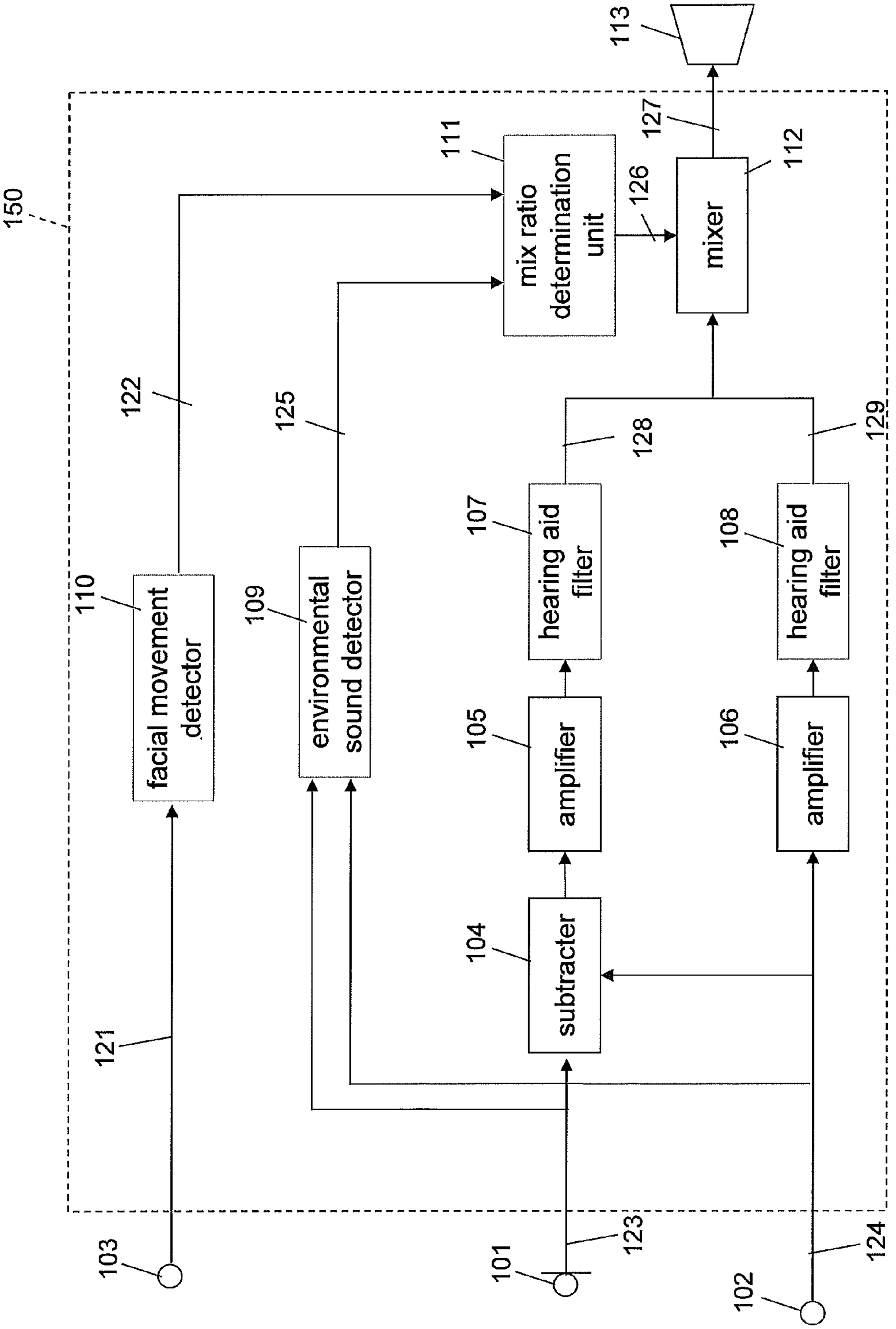
FIG. 2 is a block diagram of the hearing aid pertaining to Embodiment 1 of the present invention.

FIG. 1 is a diagram of the constitution of the hearing aid pertaining to Embodiment 1 of the present invention, and FIG. 2 is a block diagram of the hearing aid of FIG. 1. In FIGS. 1 and 2, 101 is a microphone, 102 is an external input terminal, 103 is an angular velocity sensor, 104 is a subtractor 104, 105 and 106 are amplifiers, 107 and 108 are hearing aid filters, 109 is an environmental sound detector, 110 is a facial movement detector, 111 is a mix ratio determination unit, 112 is a mixer 112, and 113 is a receiver.

The microphone 101, the external input terminal 102, the angular velocity sensor 103, the subtractor 104, the amplifiers 105 and 106, the hearing aid filters 107 and 108, the environmental sound detector 109, the facial movement detector 110, the mix ratio determination unit 111, the mixer 112, and the receiver 113 are all housed in a main body case 1 of the hearing aid, and driven by a battery 2. The microphone 101 leads outside the main body case 1 through an opening 3 in the main body case 1.

The receiver 113 is linked to a mounting portion 5 that is inserted into the ear canal of the user via a curved ear hook 4.

The external input terminal 102 is provided so that sound outputted from a television 6 or the like can be directly inputted to the hearing aid, allowing the user to enjoy clear, noise-free sound from the television 6 (an example of an external device). If the hearing aid and the television 6 or other external device are connected by a wire, then the connection terminal of a communications-use lead wire 7 can be used as the external input terminal 102. If the hearing aid and the television 6 or the like are connected wirelessly, then a wireless communications-use antenna can be used as the external input terminal 102.

A hearing aid processor 150 is configured so as to include the angular velocity sensor 103, the subtractor 104, the amplifiers 105 and 106, the hearing aid filters 107 and 108, the environmental sound detector 109, the facial movement detector 110, the mix ratio determination unit 111, and the mixer 112. 8 in FIG. 1 is a power switch, which is operated to turn the hearing aid on or off at the start or end of its use. 9 is a volume control, which is used to raise or lower the output sound of the sound inputted to the microphone 101.

In this embodiment, the angular velocity sensor 103 is provided within the main body case 1, which will be described in detail at a later point.

The hearing aid shown in FIG. 1 is a hook-on type of hearing aid. An ear hook 4 is hooked over the ear, at which point the main body case 1 is mounted so as to follow the rear curve of the ear. The mounting portion 5 is mounted in a state of being inserted into the ear canal. The angular velocity sensor 103 is disposed within this main body case 1. The reason for disposing the angular velocity sensor 103 in this way is that this sandwiches it between the back of the ear and the side of the head and maintains it in a stable state, and allows it to be properly grasped by the angular velocity sensor 103 when the user's head moves (that is, when the orientation of the user's face has changed).

The microphone 101 collects sound from around the user of the hearing aid, and outputs this sound as a microphone input signal 123 to the environmental sound detector 109 and the subtractor 104.

Meanwhile, the external input terminal 102 allows sound outputted from the television 6 or other external device to be directly inputted through the lead wire 7 or another such wired means, or with Bluetooth, FM radio, or another such wireless means. The sound inputted to the external input terminal 102 is outputted as an external input signal 124 to the environmental sound detector 109, the subtractor 104, and the amplifier 106.

The environmental sound detector 109 finds the correlation between the microphone input signal 123 inputted from the microphone 101 and the external input signal 124 inputted from the external input terminal 102. If it is decided that the correlation is low, it is determined that there are different sounds between the microphone input signal 123 and the external input signal 124, that is, that there is sound around the user that can be acquired by the microphone 101. An environmental sound presence signal 125 outputs to the mix ratio determination unit 111 a "1" when there is sound around the user, and "−1" when there is none.

The angular velocity sensor 103 is provided as an example of a facial direction detecting sensor that detects the orientation of the user's face. A facial direction detecting sensor that detects the direction of the face by using an acceleration sensor to detect horizontal movement of the head, a facial direction detecting sensor that detects the direction of the face with an electronic compass, a facial direction detecting sensor that detects the direction of the face from the horizontal movement distance on the basis of image information, or the like may also be utilized as facial direction detecting sensors, for example.

In this embodiment, a facial direction signal 121 that expresses the direction of the face detected by the angular velocity sensor 103 is outputted to the facial movement detector 110. The facial movement detector 110 detects that the direction of the user's face has deviated with respect to a reference direction acquired separately, and outputs this result as a movement detection signal 122. The method for acquiring the above-mentioned reference direction will be discussed below.

The mix ratio determination unit 111 determines the ratio in which a microphone input hearing aid signal 128, which is microphone input that has undergone hearing aid processing after being outputted from the hearing aid filters 107 and 108, and an external input hearing aid signal 129, which is external input that has undergone hearing aid processing, should be mixed and outputted from the receiver 113, and decides on a mix ratio (also expressed as dominance).

The subtractor 104 utilizes sound from a television, CD, or the like inputted from the external input terminal 102 to perform noise cancellation processing, in which the television sound surrounding the microphone 101 is cancelled out, and outputs this result to the amplifier 105. This noise cancellation processing may involve a method such as inverting the phase of external input and subtracting from the microphone input, or the like.

The amplifiers 105 and 106 amplify the microphone input signal 123 inputted from the microphone 101, and the external input signal 124 inputted from the external input terminal 102, respectively, and output them to the hearing aid filters 107 and 108, respectively.

The hearing aid filters 107 and 108 perform hearing aid processing according to the hearing of the user, and output to the mixer 112.

The mixer 112 mix the microphone input hearing aid signal 128 and the external input hearing aid signal 129 that have undergone hearing aid processing, on the basis of a mix ratio signal 126 sent from the mix ratio determination unit 111, and outputs the mixture via the receiver 113.

Some known technique such as the NAL-NL1 method can be used as the hearing aid processing that is performed by the hearing aid processor 150 (see, for example, "Handbook of Hearing Aids," by Harvey Dillon, translated by Masafumi Nakagawa, p. 236).

Specific Configuration of Mix Ratio Determination Unit 111

Figure 3:
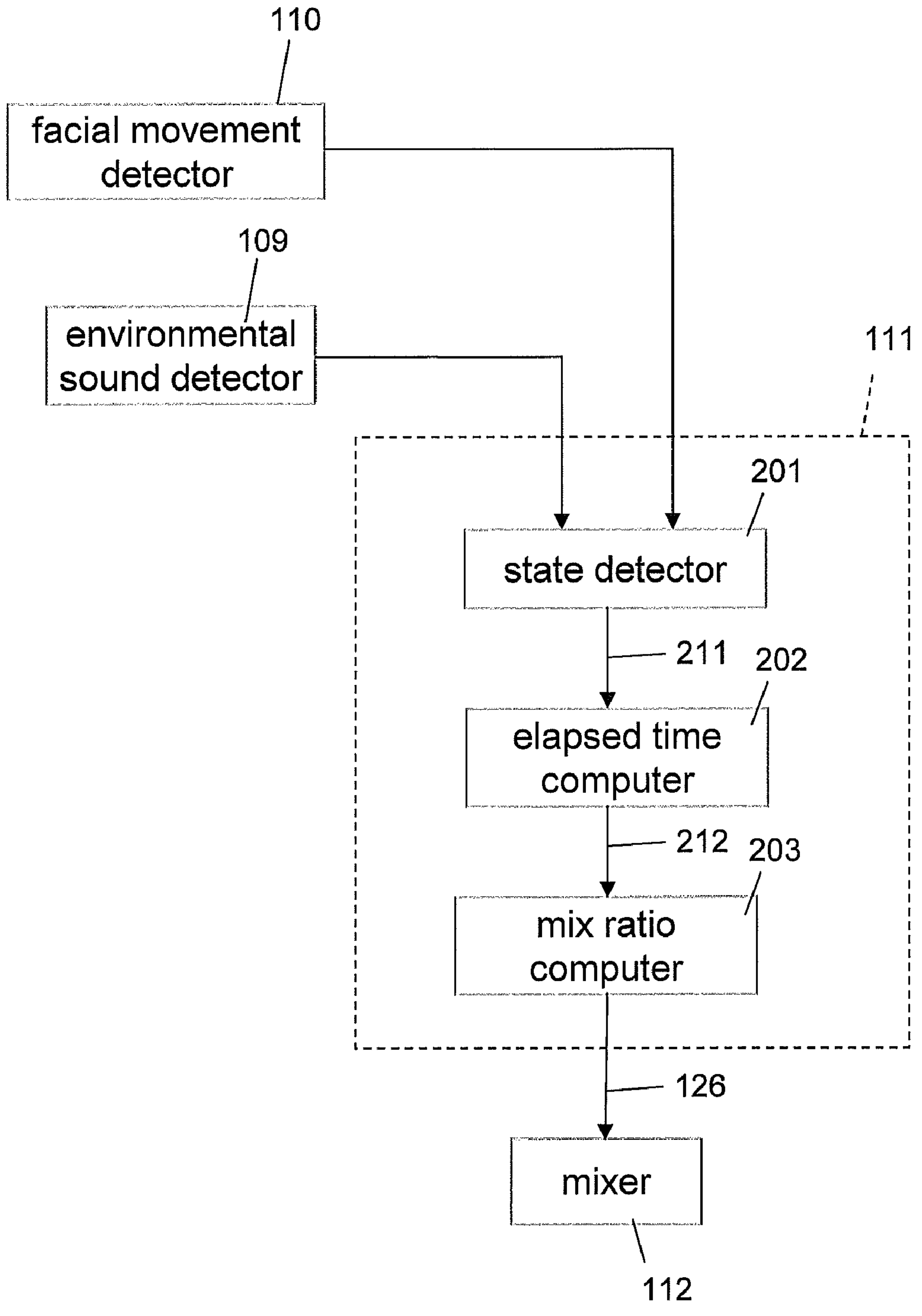
FIG. 3 is a block diagram of the mix ratio determination unit installed in the hearing aid of FIG. 2.
Figure 4:
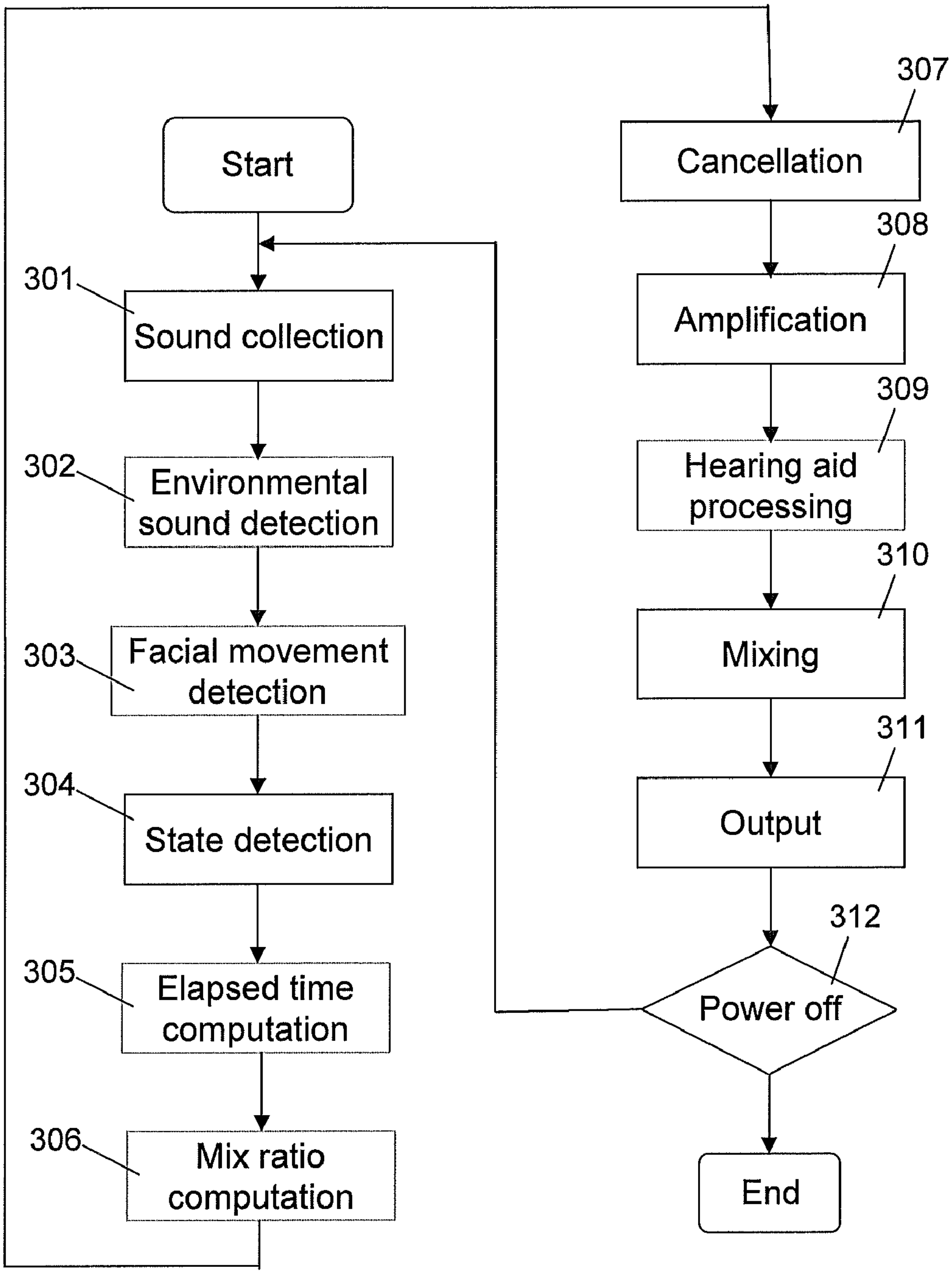
FIG. 4 is a flowchart showing the operation of the hearing aid pertaining to Embodiment 1 of the present invention.
Figure 6:
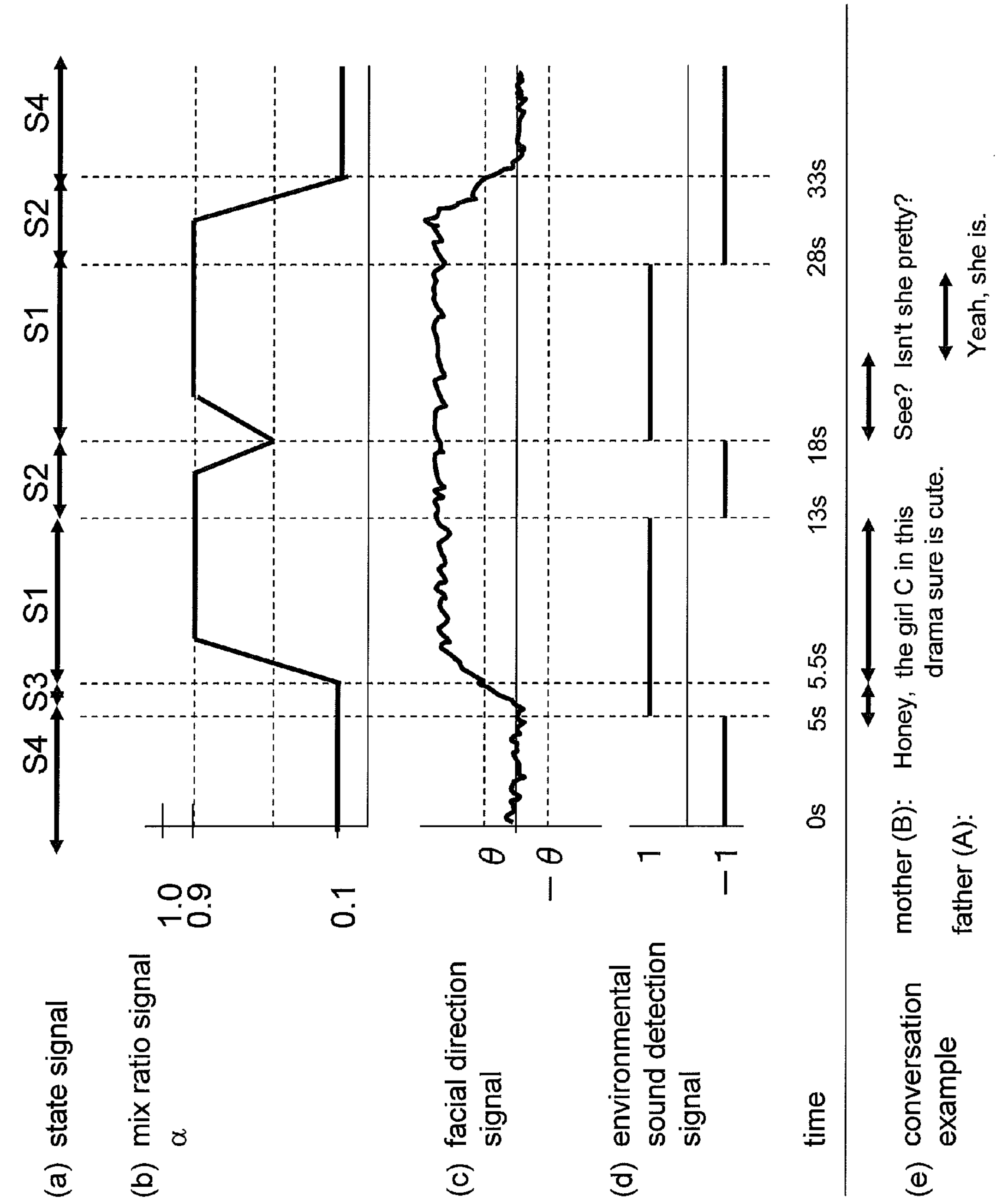
FIG. 6 is a diagram illustrating a specific operation example for the hearing aid pertaining to Embodiment 1 of the present invention.
Figure 7:
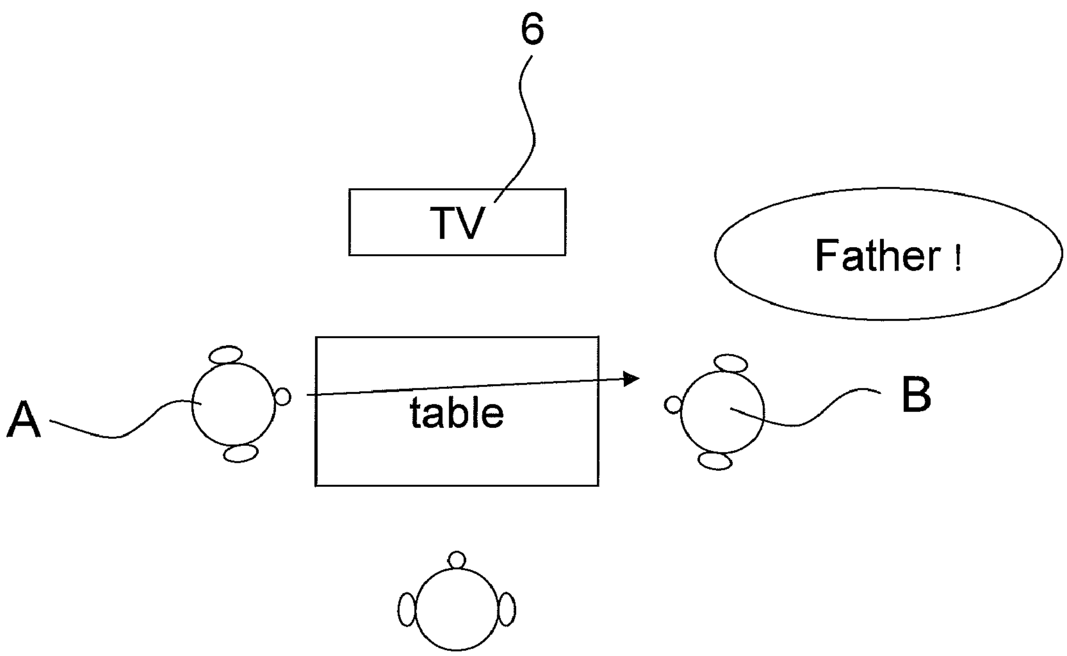
FIG. 7 is a diagram illustrating a specific operation example for the hearing aid pertaining to Embodiment 1 of the present invention.
Figure 8:
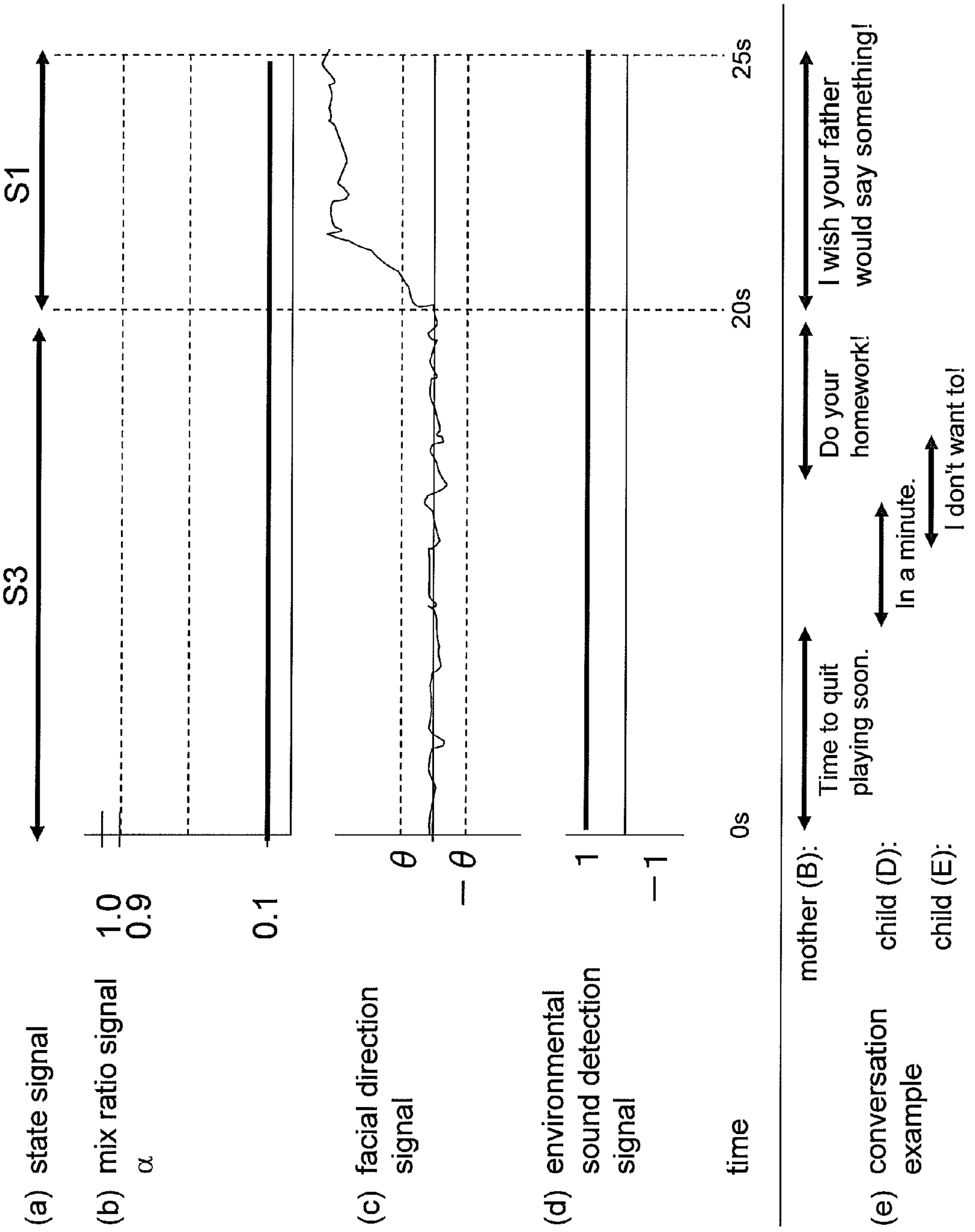
FIG. 8 is a diagram illustrating another specific operation example for the hearing aid pertaining to Embodiment 1 of the present invention.

FIG. 3 is a diagram of the detailed configuration of the mix ratio determination unit 111 shown in FIG. 2.

As shown in FIG. 3, the mix ratio determination unit 111 has a state detector 201, an elapsed time computer 202, and a mix ratio computer 203.

The state detector 201 evaluates the user state that is expressed by whether or not there is microphone input and whether or not there is facial movement, and outputs a state signal 211.

The elapsed time computer 202 computes the continuation time (how long the state has continued) on the basis of the state signal 211. The elapsed time computer 202 then outputs a continuation time-attached state signal 212, produced on the basis of the state and its continuation time, to the mix ratio computer 203. If the state detected by the state detector 201 has changed, the continuation time is reset to zero.

The mix ratio computer 203 holds a mix ratio α, which expresses the ratio at which the microphone input hearing aid signal 128 and the external input hearing aid signal 129 should be mixed. The mix ratio computer 203 updates the mix ratio α on the basis of the continuation time-attached state signal 212 and the mix ratio α, and outputs a mix ratio signal 126 indicating this mix ratio α to the mixer 112. The above-mentioned mix ratio α is an index indicating that the microphone input hearing aid signal 128 is mixed in a ratio of a with the external input hearing aid signal in a ratio of 1−α.

Operation of this Hearing Aid

Let us assume a situation in which the user of a hearing aid constituted as above is having a conversation with his family while watching the television 6 at home. The operation of the hearing aid of this embodiment will be described through reference to the flowchart shown in FIG. 4.

First, in step 301 (sound collection step), sound around the user is collected by the microphone 101, and the sound of the television 6 is acquired via the external input terminal 102.

Then, in step 302 (environmental sound detection step), the environmental sound detector 109 finds a correlation coefficient between the microphone input signal 123 inputted through the microphone 101 and the external input signal 124 inputted through the external input terminal 102. If the correlation coefficient is low here (such as when the correlation coefficient is 0.9 or less), the environmental sound detector 109 decides that there are different sounds between the microphone input signal 123 and the external input signal 124, and detects the someone in the family is talking. Here, computation of the above-mentioned correlation coefficient may be performed on input for the past 200 msec. The environmental sound detector 109 outputs an environmental sound presence signal ("1" if there is conversation, and "−1" if not) to the mix ratio determination unit 111.

Next, in step 303 (facial movement detection step), the facial movement detector 110 detects that the orientation of the user's face has deviated from the direction of the television 6 on the basis of the value of the direction indicating the orientation of the user's face acquired by the angular velocity sensor 103, and outputs a movement detection signal to the mix ratio determination unit 111. The direction of the television 6 here can be acquired by providing a means for specification of a direction ahead of time by the user, or by setting as the direction of the television 6 a direction in which there is no left-right differential in the time it takes the sound of the television 6 to reach the microphones 101 provided to both ears. Also, the fact that the orientation of the user's face has deviated from the direction of the television 6 can be detected from a change in the facial orientation of at least a preset angle θ from the direction of the television 6. If a margin is provided to the angle θ, then accidental detection caused by oversensitivity can be reduced, since it is rare for the orientation of the user's face to be fixed at all times.

Then, in step 304 (state detection step), the state the user is in is detected on the basis of the environmental sound presence signal 125 acquired by the environmental sound detector 109 in step 302 and the movement detection signal 122 acquired by the facial movement detector 110 in step 303.

As shown in FIG. 5, the state of the user is expressed by the combination of the environmental sound presence signal 125, which expresses whether sounds other than those from the television 6 have been inputted (that is, that the family is conversing), and the movement detection signal 122, which indicates whether or not there is movement of the face.

In the state S1, in which there are both input from the microphone 101 indicating that the family is conversing, and the movement detection signal 122 indicating that there is movement of the face, it is usually expected that the user will be interested in the conversation of the family.

Also, in the state S2, in which there is no input from the microphone 101, but the face of the user is moving, it is assumed that the conversation that had been going on up to that point has ceased, or that the attention of the user has shifted to the surrounding sound (conversation, etc.), and the user is trying to listen to the surrounding sound.

In the state S3, in which there is input from the microphone 101, but there is no attendant movement of the face, it is assumed that the family is conversing, but the user is not paying attention to this conversation.

In the state S4, in which there is neither input from the microphone 101 nor movement of the face, it is simply assumed that the user is listening to the sound of the television 6 inputted from the external input terminal 102.

Then, in step 305 (elapsed time computation step), it is computed how long the state detected in step 304 has continued, and the continuation time-attached state signal 212 is outputted to the mix ratio computer 203. At this point, if there has been a change in state, the continuation time is reset to zero, but if there is no change in state, its continuation time is updated.

Then, in step 306 (mix ratio computation step), the mix ratio α is updated using the following formula, on the basis of the continuation time-attached state signal 212 and the immediately prior mix ratio α.

Here, if we let the time $t_{in}$ at which a switch to each state occurred be the continuation time for that state, let $\alpha_{initial}$ be the initial value of α when there was a switch to each state, let $\alpha_{max}$, $\alpha_{min}$, and $\alpha_{center}$ be the maximum value, minimum value, and center value for α, respectively, let a be the ratio by which α is increased according to the continuation time $t_{in}$, let b by the ratio by which α is decreased according to the continuation time $t_{in}$, and let Lp be the blank time (approximately 3 seconds) that it takes for a normal person to stop for a breath while speaking, then the value of the mix ratio α at the time $t_1+t_{in}$, at which $t_{in}$ amount of time has elapsed since the start of each state can be calculated from the following Formula 1.

(when $t_{in}=0$)

$$\alpha(t_1+t_{in})=\alpha_{initial} \quad \text{Formula 1}$$

(when $t_{in}\geqq 1$) a different update formula is used for each state.

In the case of state S1:

$$\alpha(t_1+t_{in})\leftarrow\alpha\cdot t_{in}+\alpha(t_1+t_{in}-1)$$

where if $\alpha(t_1+t_{in})>\alpha_{max}$, then $\alpha(t_1+t_{in})=\alpha_{max}$ In the case of state S2:

when $0<t_{in}<Lp$: $\alpha(t_1+t_{in})\leftarrow\alpha(t_1+t_{in}-1)$ when $Lp<t_{in}$: $\alpha(t_1+t_{in})\leftarrow -b\cdot t_{in}+\alpha(t_1+t_{in}-1)$ where if $\alpha(t_1+t_{in})<\alpha_{center}$, then $\alpha(t_1+t_{in})=\alpha_{center}$ In the case of states S3 and S4:

$$\alpha(t_1+t_{in})\leftarrow -b\cdot t_{in}+\alpha(t_1+t_{in}-1)$$

where if $\alpha(t_1+t_{in})<\alpha_{min}$, then $\alpha(t_1+t_{in})=\alpha_{min}$ In the state S1, where there is assumed a situation in which the user is interested in the conversation of the family, movement of the user's face can be detected and the mix ratio $\alpha$ can be increased to the maximum mix ratio $\alpha_{max}$, by calculating the mix ratio $\alpha$ according to Formula 1 above. The input of the microphone input hearing aid signal 128 can be made more dominant than the external input hearing aid signal 129 according to the value of this mix ratio $\alpha$.

In the state S2, where there is assumed a situation in which talking has stopped in the middle of a conversation and the user is trying to listen to the surrounding sound, the system goes into standby for the time Lp that it takes for the other person to start talking, until the other person starts talking and the mix ratio is maintained. If the time Lp has been exceeded with no conversation, then the mix ratio $\alpha$ is changed so as to lower the dominance of the microphone input signal 123 from the microphone 101, while a mix ratio $\alpha_{center}$ that is sufficient to hear the surrounding sound is maintained. As a result, a state can be achieved in which both the microphone input hearing aid signal 128 and the external input hearing aid signal 129 can be properly heard, so no important information is missed.

In the state S3, where there is assumed a situation in which there is a microphone input signal 123 but the user is not interested in this sound, and in the state S4, where there is assumed a situation in which there is neither a microphone input signal 123 nor movement of the user's face, the mix ratio $\alpha$ is reduced from the initial value $\alpha_{initial}$ to the minimum value $\alpha_{min}$. Consequently, the dominance of the external input hearing aid signal 129 is raised over that of the microphone input hearing aid signal 128, so that hearing external input sound is given priority over microphone input sound.

As discussed above, in step 306 (mix ratio computation step), a new mix ratio corresponding to the most recent state can be computed on the basis of the state of the user, the continuation time of each state, and the current mix ratio.

In step 307 (cancellation processing), the subtractor 104 adjusts the gain of the microphone input signal 123 and the external input signal 124, after which the external input signal 124 is subtracted from the microphone input signal 123. Consequently, a signal corresponding to the surrounding conversation situation is selected and outputted to the amplifier 105. In the amplification step (step 308), the signal is amplified and outputted to the hearing aid filters 107 and 108.

In step 309 (hearing aid processing step), the amplified microphone input signal 123 and external input signal 124 are divided into a plurality of frequency bands by filter bank processing by the hearing aid filters 107 and 108, and gain adjustment is performed for each frequency band. The hearing aid filters 107 and 108 then output this result as the microphone input hearing aid signal 128 and the external input hearing aid signal 129 to the mixer 112.

In step 310 (mixing step), the mixer 112 adds together the microphone input hearing aid signal 128 and external input hearing aid signal 129 obtained in step 309, on the basis of the mix ratio obtained in step 306.

In step 311, the mixer 112 outputs a mix signal 127 to the receiver 113.

In step 312, it is determined whether or not the power switch 8 is off. If the power switch 8 is not off, the flow returns to step 301 and the processing is repeated. If the power switch 8 is off, however, the processing ends at step 314.

Detailed Operation of this Hearing Aid

Next, the specific operation of the hearing aid in this embodiment will be described through reference to FIGS. 6*a* to 6*e*.

In FIGS. 6*a* to 6*e* and FIG. 7, let us assume a scene in which the user (father A) is talking to a family member (mother B) while watching a drama at home on the television 6.

More specifically, 5 seconds after the start of processing in the hearing aid, the mother B says to the father A in a low voice, "Honey, the girl C in this drama sure is cute," and after a while (18 seconds later), the smiling face of person C appears on the television, and the mother B says to the father A, "See? Isn't she pretty?," in a more excited, louder voice, as if to elicit agreement. To this, the father A responds, "Yeah, she is." This is the example that will be described here.

The above conversation example is illustrated in FIG. 6*e*, the environmental sound detection signal in FIG. 6*d*, the facial direction signal in FIG. 6*c*, the mix ratio signal in FIG. 6*b*, and the state signal in FIG. 6*a*.

We will let $\alpha_{initial}$, which is the initial value of the mix ratio $\alpha$, be 0.1, let $\alpha_{min}$ be 0.1, let $\alpha_{max}$ be 0.9, let $\alpha_{center}$ be 0.5, and let Lp be 3. Since $\alpha_{initial}=0.1$, the processing is begun at mix ratio $\alpha=0.1$.

For 5 seconds there is no conversation among the family, and the user is watching the television 6, so the state is determined to be S4, and the mix ratio $\alpha$ remains at the minimum value of 0.1. Therefore, the sound of the television 6 (the external input terminal 102) and the sound of the microphone input signal 123 are mixed and outputted from the receiver 113 at a ratio of 9:1.

Then, 5 seconds later, the mother B says, "Honey, the girl C in this drama sure is cute" to the father A. At this point, the ratio of the microphone input signal 123 is a low 0.1, but when the father A turns toward the mother B when spoken to, the state signal goes through state S3 and changes to state S1.

In the state S1, according to Formula 1 above, the mix ratio $\alpha$ is increased 1 second after entering the state S1 to make the microphone input signal 123 easier to hear. Consequently, the father A is able to hear the mother B say, "Honey, the girl C in this drama sure is cute."

13 seconds after the start of processing, after the audio input of "Honey, the girl C in this drama sure is cute" has ended, the state changes to S2. After the state S2 is entered, the mix ratio $\alpha$ is maintained as long as there is the possibility that the conversation will continue. After the time $t_{in}$ elapsed since the start of the state S2 exceeds Lp, the mix ratio $\alpha$ decreases to $\alpha_{center}$.

Then (18 seconds later), person C reappears on the screen of the television 6, and the mother B who sees this says, "See? Isn't she pretty?" At this point, since the state again changes to S1, the father A is able to hear clearly what the mother B says, and can reply, "Yeah, she is" to show agreement.

In contrast, with a method in which the mix ratio is controlled by sound pressure using a conventional process, the speech of the mother B must exceed a specific sound pressure level. Accordingly, her comment of "Honey, the girl C in this drama sure is cute" made 5 seconds after the start of processing cannot be heard when uttered in the low voice of this conversation example. And then when she sees the smiling face of person C appearing on the screen of the television 6 18 seconds after the start of processing, and excitedly says, "See? Isn't she pretty?," the user cannot understand what she means, and there is a breakdown in communication.

In contrast, with the hearing aid of this embodiment, communication can be carried out that was impossible in the past, as discussed above.

As another example, let us assume a situation in which the user (father A) is at home watching the news, his children D and E are playing a television game around him, and the mother B is trying to get them to stop. This will be described through reference to FIGS. 8*a* to 8*e* and FIG. 9.

Figure 9:
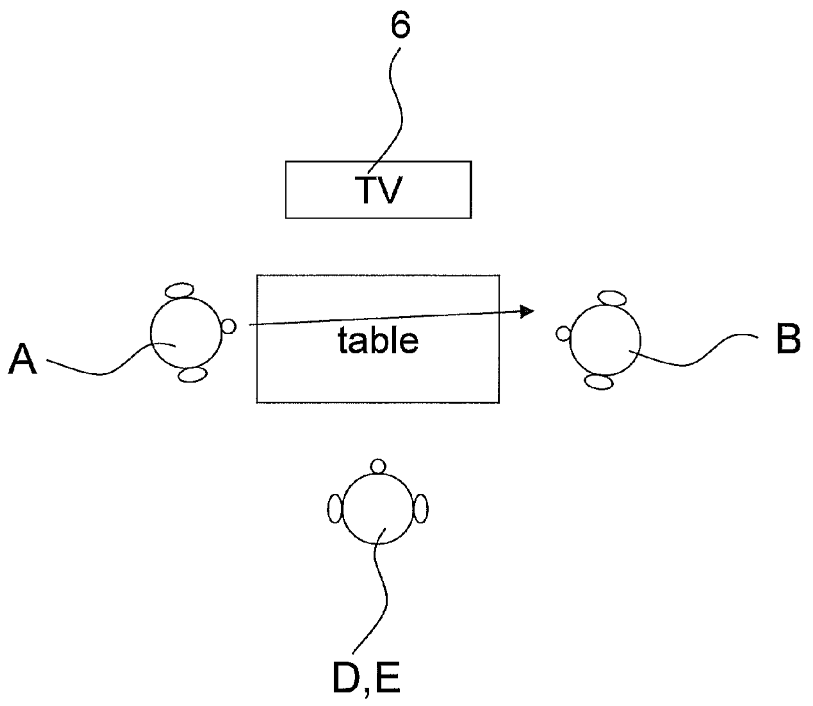
FIG. 9 is a diagram illustrating another specific operation example for the hearing aid pertaining to Embodiment 1 of the present invention.

More specifically, in the layout shown in FIG. 9, as shown in FIGS. 8*a* to 8*e*, first the mother B tells the children D and E, "Time to quit playing soon," but one child refuses, saying, "In a minute," and the other says, "I don't want to!" The mother B then angrily says, "Do your homework!," and finally asks for help by saying, "I wish your father would say something!"

With a conventional method involving sound pressure, the surrounding voices are picked up by the microphone 101, which makes it difficult for the father A to hear the sound of the news. In contrast, with the hearing aid pertaining to this embodiment, as long as the father A does not move his face, the mix ratio signal α remains unchanged at the minimum value of 0.1. Consequently, he is not bothered by the voices of the mother B or the children D and E, and can clearly hear the speech of the news inputted as the external input signal 124.

This situation is shown in FIGS. 8*a* to 8*e*. The parameters such as the mix ratio α are the same as in the example in FIGS. 6*a* to 6*e*.

When the mother B says, "Time to quit playing soon" 0 seconds after the start of processing, this is followed by the children replying, "In a minute" and "I don't want to!," and the mother B replying, "Do your homework!" Therefore, the answer to whether there is an environmental sound detection signal is "yes," and since the father A (the user) is watching the news, the facial direction signal indicates that the face is turned toward the television, so the state becomes S3. Accordingly, the mix ratio α remains at its initial value of 0.1.

After this, the father A turns his face in response to the comment of "I wish your father would say something!" from the mother B, the facial movement detector 110 detects this and sends the movement detection signal 122 to the mix ratio determination unit 111, and this increases the value of the mix ratio α. Consequently, after this the mix ratio α increases with respect to the conversation (microphone input signal 123) necessary to tell the children D and E to stop playing the game, so the father A can easily and naturally hear the surrounding conversation.

Thus, with the hearing aid pertaining to this embodiment, movement of the user's face is utilized, and the mix ratio (dominance) between the microphone input hearing aid signal 128 and the external input hearing aid signal 129 for the user can be changed by detecting that the face has moved. Consequently, the user can comfortably switch between the microphone input hearing aid signal 128 and the external input hearing aid signal 129 regardless of the loudness of the sound (speech) of the microphone input signal 123, so the hearing aid effect can be improved over that in the past.

With this embodiment, an example was described in which the mix ratio computer 203 calculated the mix ratio α on the basis of Formula 1 given above, but the present invention is not limited to this.

For example, a table for selectively choosing the mix ratio α on the basis of the continuation time and the initial value for the mix ratio α for each state (mix ratio determination table) may be stored in a memory means or the like provided inside the hearing aid. Consequently, the value of the mix ratio α an be easily determined without having to compute the mix ratio α.

Embodiment 2

The hearing aid pertaining to another embodiment of the present invention will now be described through reference to FIG. 10.

Figure 10:
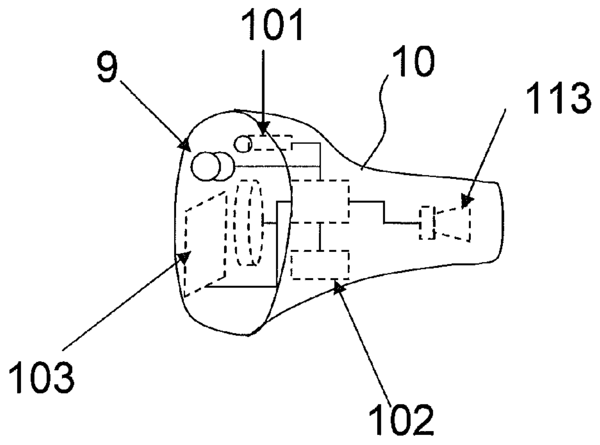
FIG. 10 is an oblique view of the hearing aid pertaining to Embodiment 2 of the present invention.

FIG. 10 shows the configuration of the hearing aid pertaining to this embodiment.

As shown in FIG. 10, the hearing aid of this embodiment is a type of hearing aid that is inserted into the ear canal, and a main body case 10 has a cylindrical shape that is narrower on the distal end side and grows thicker toward the rear end side. That is, since the distal end side of the main body case 10 is inserted into the ear canal, that side is formed in a slender shape that allows it to be inserted into the ear canal.

With the hearing aid of this embodiment, the angular velocity sensor 103 is disposed on the rear end side of the main body case 10 disposed outside the ear canal.

Meanwhile, the receiver 113 is disposed on the distal end side of the main body case 10 inserted in the ear canal.

In other words, the angular velocity sensor 103 and the receiver 113 are disposed at positions on opposite sides within the main body case 10 (positions located the farthest apart).

Consequently, the operating sound of the angular velocity sensor 103 is less likely to make it into the receiver 113, which prevents a decrease in the hearing aid effect.

Embodiment 3

The hearing aid pertaining to yet another embodiment of the present invention will now be described through reference to FIG. 11.

Figure 11:
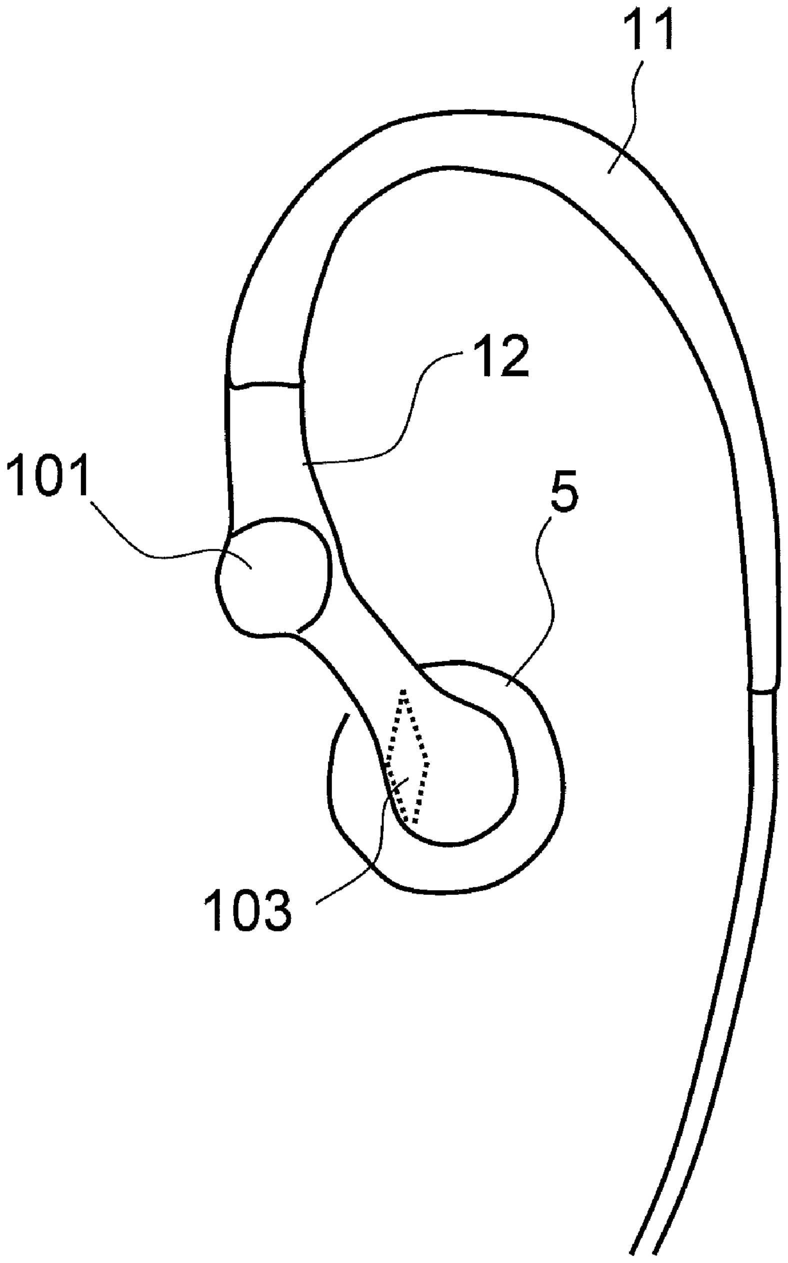
FIG. 11 is a side view of the hearing aid pertaining to Embodiment 3 of the present invention.

FIG. 11 shows the configuration of the hearing aid pertaining to Embodiment 3.

As shown in FIG. 11, the hearing aid of this embodiment is a type that makes use of an ear hook 11, and a main body case 12 is connected further to the distal end side than the ear hook 11. The angular velocity sensor 103 is disposed inside this main body case 12.

In general, the ear hook 11 is made of a soft material to make it more comfortable to the ear. Accordingly, if the angular velocity sensor 103 is disposed inside the ear hook, there is the risk that movement of the user's face cannot be detected properly.

In view of this, with this embodiment the angular velocity sensor 103 is disposed within the main body case 12 connected on the distal end side of the ear hook 11. More specifically, the angular velocity sensor 103 is disposed near the mounting portion 5 that is fitted into the ear canal.

Consequently, movement of the user's face can be detected accurately by using the angular velocity sensor 103. As a result, as discussed above, the hearing aid effect can be improved by suitably increasing or decreasing the mix ratio α according to the movement of the user's face.

With the hearing aid shown in FIG. 11, the external input terminal 102 and the hearing aid processor 150 are assumed to be provided within a main body case (not shown) provided below the right end of the ear hook 11.

Embodiment 4

The hearing aid pertaining to yet another embodiment of the present invention will now be described through reference to FIG. 12.

Figure 12:
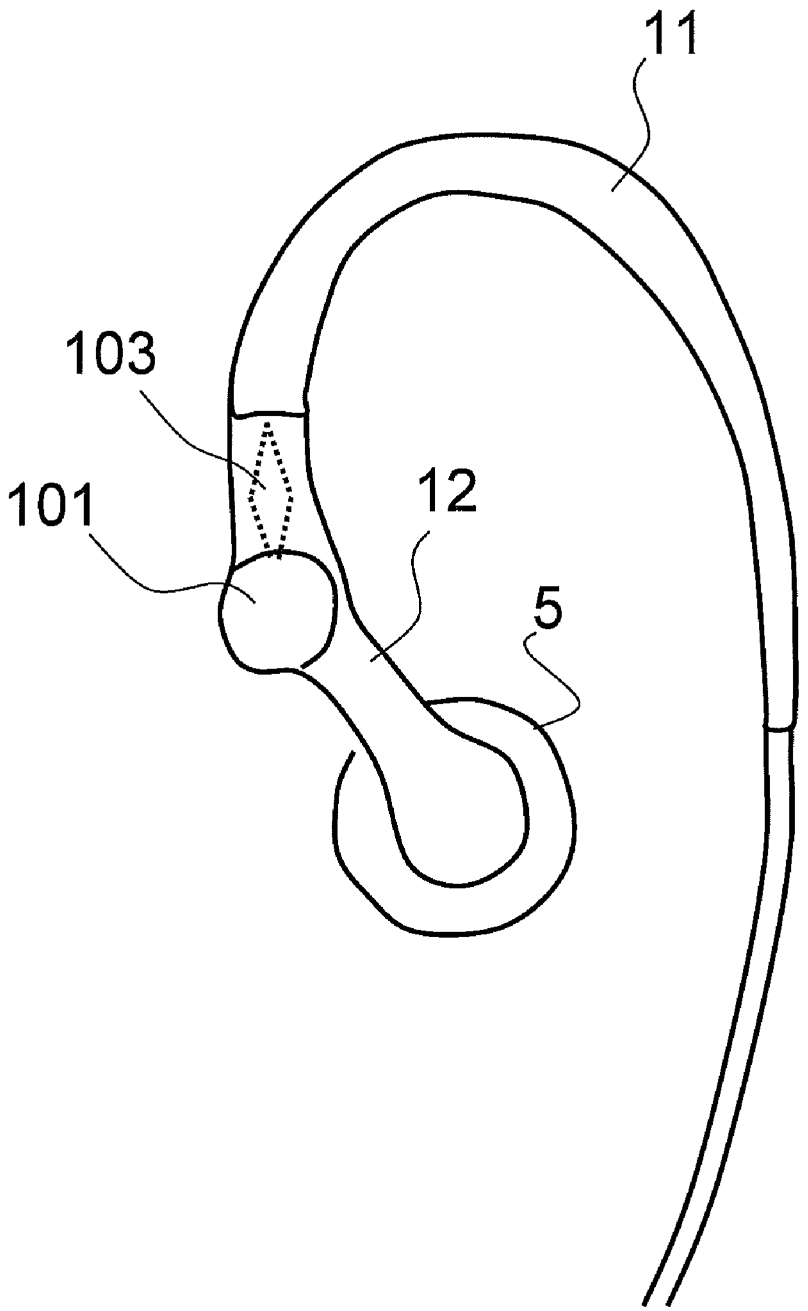
FIG. 12 is a side view of the hearing aid pertaining to Embodiment 4 of the present invention.

FIG. 12 shows the configuration of the hearing aid pertaining to this embodiment.

As shown in FIG. 12, with the hearing aid of this embodiment the angular velocity sensor 103 is disposed near the microphone 101.

The hearing aid shown in FIG. 12 is similar to the hearing aid shown in FIG. 11 in that the external input terminal 102 and the hearing aid processor 150 are assumed to be provided within a main body case (not shown) provided below the right end of the ear hook 11.

Embodiment 5

The hearing aid pertaining to yet another embodiment of the present invention will now be described through reference to FIGS. 13 and 14.

Figure 13:
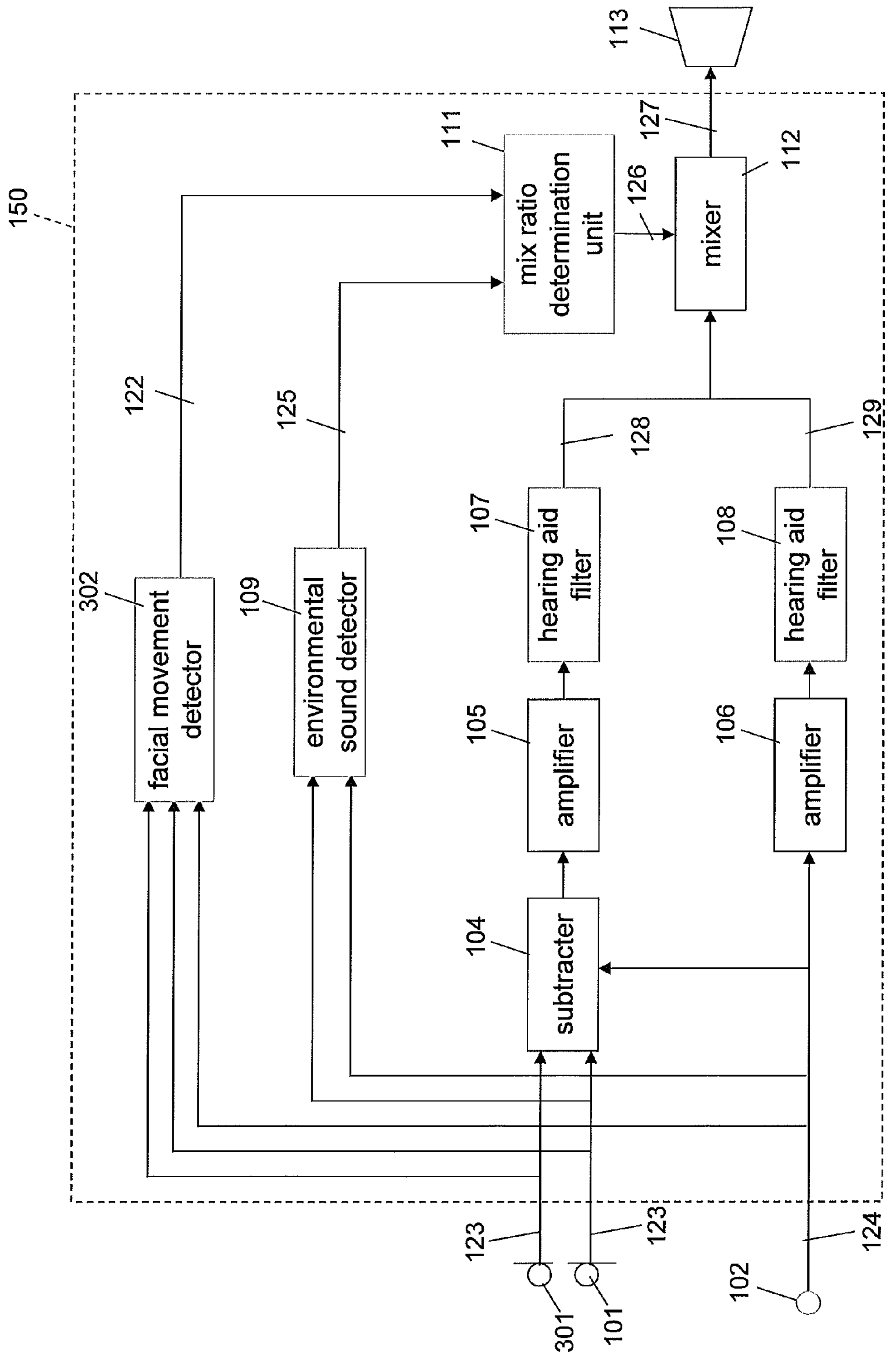
FIG. 13 is a block diagram of the hearing aid pertaining to Embodiment 5 of the present invention.

FIG. 13 is a block diagram of the configuration of the hearing aid pertaining to this embodiment.

With the hearing aid of this embodiment, instead of using the angular velocity sensor used in the above embodiments as the facial movement detector, a microphone input signal 123 acquired from two microphones (101 and 301) is utilized.

The above-mentioned two microphones 101 and 301 here may be provided to a single hearing aid, or may be provided one each to hearing aids mounted on the left and right ears.

For example, if the user turns his face in a different direction from a state in which he was facing forward at a television set while watching television, it is conceivable that a differential, such as a specific time differential or sound pressure differential, determined from the mounting positions of the two microphones 101 and 301 may occur in the microphone input signals 123 obtained from the microphones 101 and 301 that pick up surrounding sound. In view of this, with this embodiment, this time differential or sound pressure differential is utilized as the similarity between the two microphone input signals 123 to determine whether or not the direction of the face has deviated from the reference state.

Figure 14:
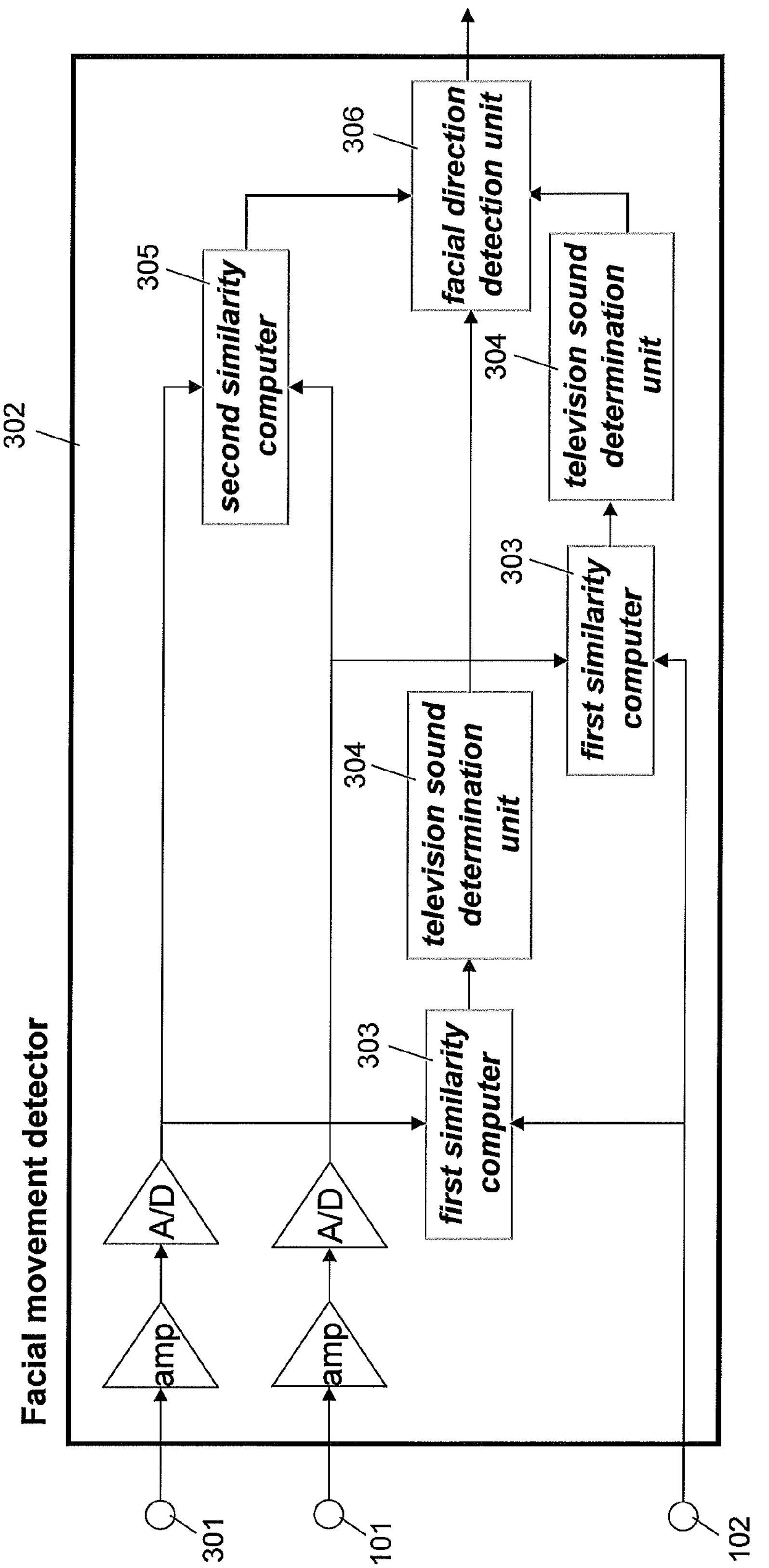
FIG. 14 is a block diagram of the facial movement detector provided to the hearing aid of FIG. 13.

FIG. 14 is a block diagram of the configuration of the facial movement detector 302 provided to the hearing aid of this embodiment.

With the hearing aid of this embodiment, before determining whether or not the user's face has moved, first it is determined whether or not the input sound acquired by the two microphones 101 and 301 is output sound from the television.

Specifically, a first similarity computer 303 computes a first similarity by comparing each of the microphone input signals 123 obtained with the microphone 101 and the microphone 301 with the external input signal 124 obtained with the external input terminal 102. A television sound determination unit 304 performs threshold processing and determines, on the basis of this first similarity, whether or not the sound outputted from the television has been obtained by the microphones 101 and 301 as ambient sound.

We will now describe the method for determining whether or not there is movement of the user's face when it has been determined that the sounds obtained by the microphones 101 and 301 are television sounds.

First, the similarity of the two microphone input signals obtained from the two microphones 101 and 301 when the user's face is turned in the direction of the reference state (such as when the user's face is turned toward the television) is calculated as a second similarity by a second similarity computer 305.

A facial direction detection unit 306 detects whether or not this second similarity has changed, and if the proportional change in the second similarity falls within a specific range, it is determined that there is no movement of the user's face, but if the proportional change in the second similarity is outside the specific range, it is determined that there is movement of the user's face.

Specifically, whether or not there is movement of the user's face can be determined by utilizing the fact that the value of the second similarity, which indicates the degree of similarity between the microphone input signal and the external input signal, changes depending on whether the orientation of the user's face is in the reference state or has deviated from the reference state.

For instance, if a sound pressure differential is used as the second similarity, the sound pressure differential between the microphone input signals 123 from the microphones 101 and 301 provided to the left and right hearing aids is usually less in the reference state, in which the user is facing toward the television, and greater away from the reference state, when the user is facing in a direction other than toward the television.

Accordingly, with this embodiment, it can be determined whether or not there is movement of the user's face by detecting a change in the sound pressure differential between the input sounds obtained from the left and right microphones 101 and 301. Similarly, a time differential, a cross correlation value, a spectral distance measure, or the like can be used as the second similarity instead of using the sound pressure differential between the two microphone input signals 123.

When there is loud ambient sound other than television sound, it is difficult for the first similarity computer 303 to decide whether or not the microphone input signals are television sounds. As a result, there is the risk that movement of the user's face cannot be determined.

To solve this problem, just the television sound may be extracted by using a technique for extracting only the television sound unit from a microphone input signal, such as noise removal, echo cancellation, sound source separation, or another such technique for selecting only a particular sound from among a plurality of sounds. Consequently, whether or not the microphone input signals acquired from the two microphones correspond to television sound can be decided more accurately by the first similarity computer 303.

ADVANTAGEOUS EFFECTS

With the hearing aid pertaining to the present invention, a facial movement detector is connected to a mix ratio determination unit for determining the mix ratio between a sound signal from a microphone and a sound signal from an external input terminal.

Consequently, when the user wants to focus his attention on listening to an external device, the system detects that his face is turned toward the external device, and the sound signal from the external input terminal becomes dominant, so the sound of chatting by surrounding people does not bother the user.

Also, if a family member, for example, talks to the user in a state in which the sound signal from the external input terminal has priority, the facial movement detector will detect that the user turns his face toward the other person.

Consequently, the dominance of the sound signal inputted from the microphone is raised over that of the sound signal inputted from the external input terminal according to movement of the face based on the intent to hear what the family member is saying at this point, which allows the user to hear and understand what his family is saying. As a result, the hearing aid effect can be enhanced.

Also, with the present invention, the constitution can be such that when the environmental sound detector detects that the sound signal acquired from the microphone does not include anything but the acoustic information acquired from the external input terminal, and the facial movement detector detects that the orientation of the face has changed from the reference direction, then the mix ratio determination unit changes the mix ratio for the sound signal acquired from the microphone so as to raise its dominance.

Consequently, it is possible to raise the dominance of the microphone input signal for a hearing aid user who wants to hear the sound signal acquired from the microphone.

Also, with the present invention, when the facial movement detector finds that the orientation of the face is in the reference direction, the mix ratio determination unit can change the mix ratio so as to lower the dominance of the sound signal acquired from the microphone.

This makes it possible to change to a mix ratio that raises the dominance of the external input terminal for a user who wants to hear the sound signal outputted by an external device.

Also, in this embodiment, if the environmental sound detector detects that the sound signal acquired from the microphone does not include anything but the sound information acquired from the external input terminal, and the facial movement detector detects that the orientation of the face has changed from the reference direction, then the mix ratio determination unit can change to a mix ratio that will set a medium dominance for the sound signal acquired from the microphone and the sound information acquired from the external input.

Specifically, with this embodiment, when it is detected that the orientation of the user's face has changed, even if no other sound besides the external input has been inputted to the microphone, it is assumed that the user's attention has been diverted to something in his surroundings, and the dominance of the sound information acquired from the microphone and the external input is set to be substantially equal for both ($\alpha \approx 0.5$).

Consequently, the microphone input signal that is necessary for the user to pay attention to his surroundings can be provided. Furthermore, the sound of the external input signal can similarly be heard at this point.

Also, with the present invention, the mix ratio determination unit can be made up of a state detector for detecting the state of the user, which is decided on the basis of whether or not there is environmental sound and whether or not there is deviation in the orientation of the user's face, an elapsed time computer for keeping track of how long the state detected by the state detector has continued, and a mix ratio computer for computing a new mix ratio on the basis of the state detected by the state detector, the continuation time computed by the elapsed time computer, and the immediately prior mix ratio.

Consequently, the state of the user can be determined from deviation of his face from the reference state and whether or not there is environmental sound, and the mix ratio can be calculated from the continuation time of this state.

Also, with the present invention, the mix ratio computer can be provided with a mix ratio determination table that allows the mix ratio to be determined on the basis of the mix ratio at the start of each state, the state detected by the state detector, and the continuation time computed by the elapsed time computer.

Consequently, this mix ratio determination table can be used to perform hearing aid processing more efficiently, so it is possible to perform hearing aid processing by table look-up processing, without computing the mix ratio.

Other Embodiments (A)

In the above embodiments, such as in Embodiment 1, an example was given in which the hearing aid processor 150 included the angular velocity sensor 103, the environmental sound detector 109, the facial movement detector 110, the mix ratio determination unit 111, the mixer 112, and so forth, but the present invention is not limited to this.

For instance, regarding the configuration of the mixer, etc., they do not necessarily have to be provided within the hearing aid processor, and the configuration of these units, or the configuration of some of them, may be such that they are provided separately in a parallel relation with respect to the hearing aid processor.

(B)

In Embodiment 5 above, a method in which whether or not there was movement of the user's face was determined while monitoring the change in the above-mentioned second similarity was given as an example of making this determination using a second similarity, but the present invention is not limited to this.

For instance, the above-mentioned determination may be made using the sound pressure differential, time differential, cross correlation value, spectral distance measure, etc., of the microphone input signal obtained from the microphones 101 and 301 of hearing aids provided to the left and right ears.

That is, the above-mentioned determination may be made on the basis of whether or not the detected sound pressure differential, etc., is within a specific range, rather than computing the change in the second similarity.

INDUSTRIAL APPLICABILITY

With the hearing aid of the present invention, proper hearing aid operation can be carried out according to movement of the user's face, so this invention can be applied to a wide range of hearing aids that can be connected, either with a wire or wirelessly, to various kinds of external device, include a television, a CD player, a DVD/HDD recorder, a portable audio player, a car navigation system, a personal computer, or another such information device, a door intercom or other such home network device, or a cooking device such as a gas stove or electromagnetic cooker.

REFERENCE SIGNS LIST

1 main body case
2 battery
3 opening
4 ear hook
5 mounting portion
6 television (an example of an external device)
7 lead wire
8 power switch
9 volume control

10 main body case
11 ear hook
12 main body case
101 microphone
102 external input terminal
103 angular velocity sensor
104 subtractor
105 amplifier
106 amplifier
107 hearing aid filter
108 hearing aid filter
109 environmental sound detector
110 facial movement detector
111 mix ratio determination unit
112 mixer
113 receiver
121 facial direction signal
122 movement detection signal
123 microphone input signal
124 external input signal
125 environmental sound presence signal
126 mix ratio signal
127 mix signal
128 microphone input hearing aid signal
129 external input hearing aid signal
201 state detector
202 elapsed time computer
203 mix ratio computer
211 state signal
212 continuation time-attached state signal

The invention claimed is:

1. A hearing aid, comprising:

a microphone configured to acquire sound and generate a corresponding microphone-input signal;

an external input terminal configured to acquire an inputted audio signal from an external device and generate a corresponding external-input signal;

a hearing aid processor configured to receive the microphone-input signal from the microphone and the external-input signal from the external input terminal, subject the microphone-input signal to hearing aid processing to produce a microphone hearing aid signal, and subject the external-input signal to hearing aid processing to produce an external-input hearing aid signal;

a facial movement detector configured to detect movement of the user's face and to generate a movement detection signal;

an environmental sound detector configured to detect an amount of correlation between the microphone-input signal and the external-input signal and to generate, based on the detected amount of correlation, an environmental sound presence signal which indicates whether or not environmental sound is present in addition to sound represented in the external-input signal; and a mix ratio determination unit configured to determine a mix ratio of the microphone hearing aid signal and the external-input hearing aid signal based on the environmental sound presence signal and the movement detection signal;

a mixer configured to mix the microphone hearing aid signal and the external-input hearing aid signal based on the mix ratio signal to generate a processed signal; and a receiver configured to receive and output the processed signal.

2. The hearing aid according to claim 1, wherein, if the environmental sound detector detects a low correlation between the microphone-input signal and the external-input signal, and if the facial movement detector detects movement of the user's face, then the mix ratio determination unit changes the mix ratio so that the microphone hearing aid signal is dominant over the external-input hearing aid signal.

3. The hearing aid according to claim 1, wherein, when the facial movement detector detects that the facial orientation is in a reference direction, the mix ratio determination unit changes the mix ratio so that the external-input hearing aid signal is dominant over the microphone hearing aid signal.

4. The hearing aid according to claim 1, wherein, when the environmental sound detector detects a high correlation between the microphone-input signal and the external-input signal and the facial movement detector detects movement of the user's face, the mix ratio determination unit sets the mix ratio so that the microphone hearing aid signal and the external-input hearing aid signal are substantially equal.

5. The hearing aid according to claim 1, wherein the mix ratio determination unit has:

a state detector configured to detect the state of the user based on the environmental sound presence signal and the movement detection signal;

an elapsed time computer configured to keep track of how long the state detected by the state detector has continued; and a mix ratio computer configured to compute a new mix ratio based on the state detected by the state detector, the continuation time computed by the elapsed time computer, and an immediately prior mix ratio.

6. The hearing aid according to claim 5, wherein the mix ratio determination unit further bases the computation of the new mix on a mix ratio determination table including an initial value for the mix ratio at the start of each state and the continuation time computed by the elapsed time computer for each state detected at the mix ratio computer.

7. The hearing aid according to claim 1, further comprising a main body case in which are provided the microphone, the external input terminal, the hearing aid processor, and the receiver.

8. The hearing aid according to claim 7, wherein the facial movement detector is provided at a position opposite a position where the receiver is provided within the main body case.

9. The hearing aid according to claim 7, wherein the facial movement detector is provided more to the receiver side in the main body case than an ear hook that hooks onto the user's ear.

10. The hearing aid according to claim 1, wherein the facial movement detector has a facial direction detecting sensor configured to detect the orientation of the user's face.

11. The hearing aid according to claim 10, wherein the facial direction detecting sensor is an angular velocity sensor configured to detect a change in the orientation of the user's face.

12. The hearing aid according to claim 1, further comprising:

a second microphone configured to acquire sound and generate a corresponding second-microphone-input signal;

wherein the facial movement detector computes a first similarity that indicates: a degree of similarity between the sound represented in the microphone-input signal and sound represented in the external-input signal; and a degree of similarity between the sound represented in the second-microphone-input signal and sound represented in the external-input signal, and, if the first similarity is within a specific range, decides that the sounds represented in the microphone-input signal and the sound represented in the second-microphone-input signal are sounds represented in the external-input signal, and computes a second similarity that indicates a degree of similarity between microphone-input signal and the second-microphone-input signal, and, if the second similarity is outside a specific range obtained when the orientation of the user's face is a reference state, decides that the user's head has moved.

13. The hearing aid according to claim 12, wherein the facial movement detector computes the first similarity by using a cross correlation as the first similarity.

14. The hearing aid according to claim 12, wherein the facial movement detector computes the second similarity and detects movement of the user's head by using one of the following:

a cross correlation between the microphone-input signal and the second-microphone-input signal, the sound pressure differential between the microphone-input signal and the second-microphone-input signal, the phase differential or time differential between the microphone-input signal and the second-microphone-input signal, and the spectral distance measure between the microphone-input signal and the second-microphone-input signal.

* * * * *